United States Patent [19]
Bliss et al.

[11] Patent Number: 4,849,776
[45] Date of Patent: Jul. 18, 1989

[54] ELECTROSTATIC PRINTER FOR DIGITIZED IMAGES OR DATA

[75] Inventors: Arthur E. Bliss, Sunnyvale; Gene F. Day, Cupertino; Claus P. J. Suverkropp, Sunnyvale, all of Calif.

[73] Assignee: Precision Image Corporation, Redwood City, Calif.

[21] Appl. No.: 763,040

[22] Filed: Aug. 6, 1985

[51] Int. Cl.$^4$ .................................... G01D 15/00
[52] U.S. Cl. .................................... 346/157; 346/101
[58] Field of Search ............... 346/138, 155, 157, 101, 346/160, 108, 160.1; 358/289–291; 355/10

[56] References Cited

U.S. PATENT DOCUMENTS

| | | | |
|---|---|---|---|
| 3,069,494 | 12/1962 | Fischer | 358/291 |
| 3,656,173 | 4/1972 | Fussel | 346/74 ES |
| 4,257,071 | 3/1981 | Lamb | 358/286 |

Primary Examiner—Arthur G. Evans
Attorney, Agent, or Firm—Thomas Schneck

[57] ABSTRACT

An electrostatic drum printer having a linear array of charging elements scanning a sheet of paper with a helical stripe pattern. The head is supported on a lead screw which advances the head as the drum rotates. The head writes an electrostatic latent image of digital words which visually appear as adjacent columns once the sheet is toned and laid flat. A toning shoe assembly is carried along with the head, with a single toning shoe, having a toner of a specified color, adjacent the head. When the head reaches the end of a scan, the head and shoe assembly is retracted for fly back to a starting position. A new toning shoe, having a toner of another color, may be indexed into position near the head. The retracted elements are pushed forward for starting another scan. With several scans, a color image may be recreated.

29 Claims, 3 Drawing Sheets

ELECTROSTATIC PRINTER FOR DIGITIZED IMAGES OR DATA

TECHNICAL FIELD

The invention relates to electrostatic printing and more particularly to printing on charge retentive sheets by means of a fluid developer.

BACKGROUND ART

In prior art electrostatic drum printing on sheets, such as in facsimile machines, an analog signal was converted directly into a charge pattern. However, this usually meant that only a single raster line at a time was being painted onto a rotating drum. Attempts have been made to increase the rate of printing by increasing the speed of rotation of the drum. However, this sometimes results in a loss of resolution.

In U.S. Pat. No. 3,656,173 R. Fussel discloses a printing system involving creation of a latent electrostatic image on a sheet of paper carried by a rotating drum. A fine stream of liquid developer is directed onto the paper at a spaced apart distance from a stylus which deposits a charge pattern. A vacuum pickup head is positioned to follow the trace of the developer so that excess liquid may be removed from the paper surface. The drum is axially translated with respect to the developer stream, the stream tracing a helical pattern on the drum surface.

One of the chief benefits achieved in the drum printer described in the Fussel patent is that the sheet being printed upon is fully stabilized by the drum during the printing process. This is an advantage over web systems, where sheets being printed are subject to discernable changes in size. On the other hand, web systems allow very rapid scanning of the sheet past a stationary head for extremely fast printing. Line printers print the entire width of a sheet at such fast rates, but employ wide printing heads which are very expensive.

In U.S. Pat. No. 4,257,071 R. Lamb discloses a planar image scanning and printing system wherein a linear array of optical sensing elements is moved in a raster scanning pattern across a sheet. The linear array of scanning elements may be combined with a linear array of printing elements, sharing similar motion. The array of scanning printing elements allows sequential printing of digital words using a lateral scanning pattern analogous to the scanning of a cathode ray tube.

An object of the present invention was to devise an electrostatic printer having the sheet stability of a drum type printer, but also using printing elements which are faster than those in conventional facsimile systems, yet without the expense involved in full width line printer heads.

Another object of the invention was to devise a color electrostatic printer.

Yet another object of the invention was to devise a digital electrostatic printer with precise color dot registration.

DISCLOSURE OF THE INVENTION

The above objects have been met with a drum printer which features a head with a linear array of closely spaced charging elements for writing an electrostatic latent image helical stripe pattern on a sheet mounted on the drum. A toning shoe, following the linear array of charging elements, develops the latent image into a visible image. When the sheet is laid out, the stripe pattern consists of adjacent columns of digital multi-bit words forming an image. Side-by-side alignment of columns makes boundaries undiscernible. After one scanning pass of the head over the sheet, the head flies back for a second pass, if color printing is employed. Another toning shoe, carrying a developer of a different color, is indexed to follow the head. By means of multiple passes over the sheet, full color images may be produced.

One of the chief advantages of the present invention is low cost derived from an inexpensive printing head. The linear array of charging elements is actually two rows of wires, e.g. traces printed on opposite sides of a thin circuit board, with opposed wires offset from each other. Head motion is parallel to the axis of the drum, synchronized by a lead screw relative to the rotation of the drum, for making the helical stripe pattern. By using a relatively small head, manufactured using printed circuit technology, the cost of the printer is much less than that of wide head printers. Moreover, an advantage of using a drum for printing is that paper size is stabilized compared to continuous web printers.

BEST MODE FOR CARRYING OUT THE INVENTION

Figure 1:
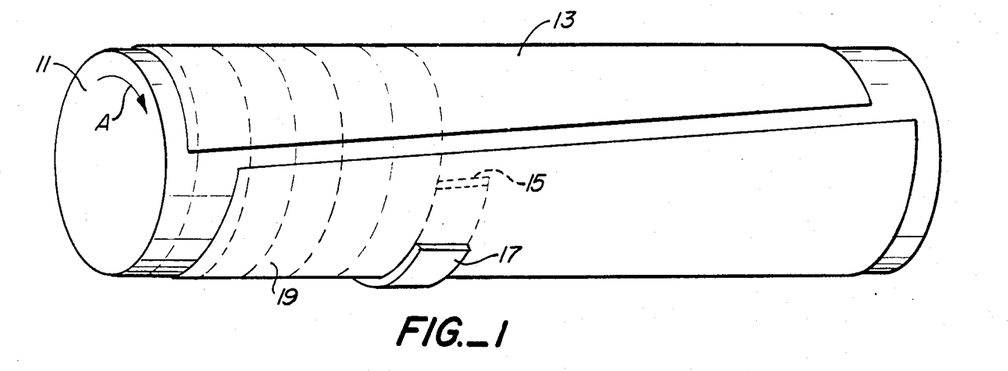
FIG. 1 is a simplified plan perspective view of the apparatus of the present invention.

With reference to FIG. 1, drum 11 may be seen supporting a sheet of paper 13 for rotation. While the drum rotates in the direction of arrow A, its axis is fixed and so the drum does not translate laterally, only rotationally. An electrostatic head in contact with the paper 13 at location 15 is translated laterally, parallel to the axis of the drum 11. The head has a forward edge in contact with the sheet 13, with a linear array of 1024 wires forming charging elements in very close proximity to the sheet 13. The number of wires may range between 100 and 10,000. Sheet 13 is coated so that it is a charge retaining dielectric material of high sheet resistivity. The drum operates at electrical ground or at a positive potential. The charging elements are at a negative potential of 400 to 600 volts relative to the drum. Polarities may be reversed. No electrical current is intended to flow through the paper coating.

A toning shoe 17, following head 15, applies liquid toner to the electrostatic latent image existing in the charge pattern deposited onto the sheet. The head and toning shoe move together laterally and continuously so that a helical stripe pattern 19, indicated by dashed lines, is traced on sheet 13 by the relative motion of the head and shoe on the one hand and the drum on the other hand. Toning shoe 17 supplies toner to the sheet and includes a drying roller to remove excess developer.

Figure 2:
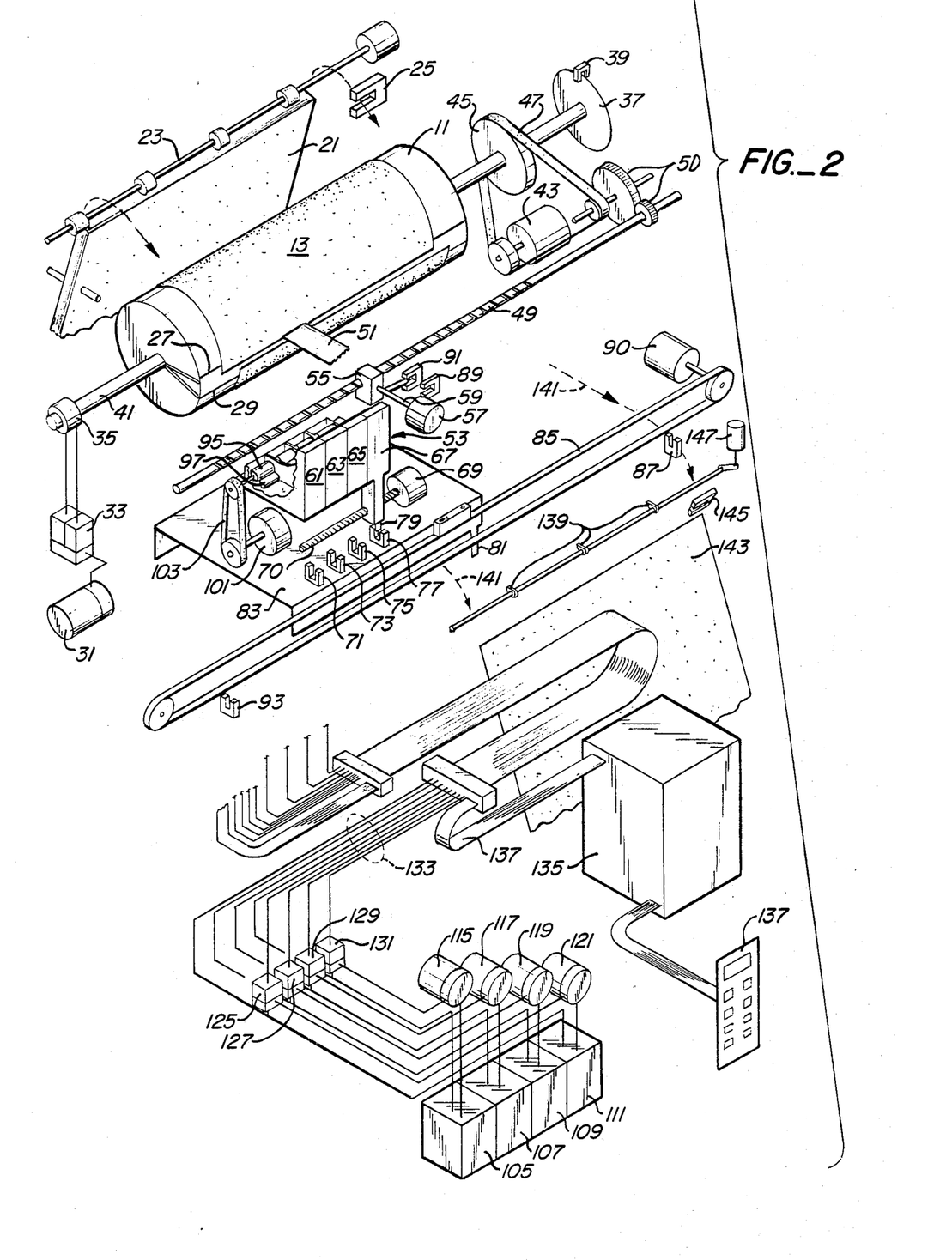
FIG. 2 is an exploded detailed plan perspective view of the apparatus of the present invention.

The apparatus may be seen in more detail in FIG. 2. A sheet from a feeder 21 is driven by supply roller 23 through an optical sensor 25 onto drum 11. The purpose of optical sensor 25 is to time the position of the edge of the sheet when a sheet first passes through the sensor. It is important to time the sheet so that the proper position of the drum can be made available to receive the sheet.

The drum may have a pair of vacuum channels 27 and 29 which are passages embedded in the drum having pumped apertures for holding sheet 13. Preferably, the channels should be spaced to secure the top and bottom edges of a sheet. The channels are evacuated by means of a vacuum pump 31 having an output controlled by solenoids 33 which is then connected through a vacuum collar 35 to the two channels 27 and 29. The first vacuum channel 27 is used to secure the top of a sheet while the other channel secures the bottom. Thus, the top channel 27 must be in approximately a 12 o'clock position to receive a sheet coming through sensor 25. The position of the drum is known from an optical encoder 37 which is a film disk having a plurality of black and clear radial stripes thereon. The marks are read by another optical sensor 39.

The diameter of drum 11 is approximately 12 inches and its width is wider than sheets to be supported. The edge of the drum, extending from slightly inside the region of where paper is to be supported may be slightly relieved to prevent edge wetting when using fluid developers. The drum is rotated about its axial shaft 41 by means of a continuously rotating motor 43 turning pulley 45 by means of belt 47. Motor 43 also turns a lead screw 49 by means of gears 50. Lead screw 49 carries the head 51 as well as toner shoe assembly 53 and platform 83. Head 51 and toner shoe assembly 53 are supported on a carrier assembly, not shown, which is connected to lead screw 49 by means of a retractable half nut 55. A solenoid 57 provides motion to an arm 59 which retracts half nut 55 from lead screw 49 on command. In the retracted position, no motion is imparted to the head, toning shoe assembly and platform by the lead screw. The retracted position is used for flyback, discussed below. At another command the solenoid 57 causes the half nut to come back into contact with the lead screw, thereby again providing motion to both the head and the toning shoe. The toning shoe assembly 53 consists of four individual toning shoes 61, 63, 65 and 67. Each shoe is approximately the same width as the head 51. A motor 69 turns another screw 70, placing a selected toning shoe directly beneath head 51. Different shoes carry different color developers whereby a selected toning color may be dispensed from a toning shoe indexed to a position below the head by screw 70. A series of optical sensors 71, 73, 75, 77 senses the position of a finger 79 extending from one of the toning shoes 67. The finger indicates the position of the toning shoes relative to the head. An optical sensor consists of a light transmitter and detector, separated by a narrow space. When the light beam is interrupted, the sensor is activated. Thus, when the finger 79 passes through a sensor the position of toning shoe 67 is known. Since the other toning shoes are fixed in relation to toning shoe 67, their positions are also known.

As mentioned, each shoe applies a different color of toner to an image. For example, the toning shoe 61 may be the first toning shoe which is used and is directly centered below electrostatic head 51. This shoe may contain a toner which supplies a black color to the latent image. The second toning shoe 63 may supply a cyan color, a third toning shoe 65 may supply a magenta color and a fourth toning shoe 67 may supply a yellow color. In the position shown in FIG. 2 the black toning shoe 61 would be directly below head 51. After one complete scan of sheet 13 by the head 51 by movement along the lead screw from left to right, the toning shoe assembly is indexed to the left so that the second toning shoe, 63, carrying a cyan developer, is below head 51.

With half nut 55 in contact with lead screw 49, the shoe assembly 53 moves to the right as head 51 scans paper on rotating drum 11. Drum rotation is at about 20 rpm. When the head reaches the right hand edge of the paper, this is detected by a finger 81 extending from platform 83 on which the shoe assembly 53 is riding. The entire assembly is being driven by half nut 55. Although the platform is connected to belt 85, the belt is not driven until the finger 81 projects into the optical sensor 87. When this occurs, half nut 55 is retracted from lead screw 49 by solenoid 57 and the retracted position is sensed by an optical switch 89. In the retracted position, the head 51 and shoe assembly 53 are no longer driven. At this time, flyback motor 90 is energized and belt 85 is caused to move in the opposite direction, carrying platform 83, shoe assembly 53 and head 51 back to an initial position. The arrival of platform 83 at this initial position is sensed by optical sensor 93 sensing the finger 81. When this occurs, the solenoid 57 advances arm 59 until the optical sensor 91 senses the forward position of the arm, at which half nut engages lead screw 49.

In FIG. 2, the position of the toner shoe appears shown somewhat removed from the drum. The actual position of the toning shoe is one very closely spaced to the sheet 13, being separated only by a few mils. Each toning shoe carries a drying roller, such as roller 95. A wiper blade 97 removes excess fluid from the wiper roller 95. The roller 95 is powered by motor 101 transmitting rotary force through belt 103. Toner is supplied to the toning shoes from supply tanks 105, 107, 109 and 111. Pumps 115, 117, 119 and 121 transmit developer through the valves 125, 129 and 131 into flexible conduit 133 which goes to developer shoes 61-67. Each of the supply tanks 105-111 contains a color developer or toner corresponding to the colors of toner in shoes 61-67. Drain lines as shown return the spent toner to the appropriate supply tank.

An electrical control box 135 receives a block of digital data consisting of bits to be printed on a sheet. An operator may initiate printing through a control panel 137. The control box 135 divides the block of digital bits to be printed into columns to be sequentially transmitted to the printer one after another so that printing appears to be in the form of helical scanning of the paper, with one column continuously fed after another. A momentary pause in printing may be used in going from one column to the next at the top and bottom of a page where margins may exist or a gap in the wrap of a sheet about the drum. Within each column of data, the width of a column is taken as a digital word. This width corresponds to the writing width of the head. The pitch of the lead screw and the rate of rotation of the drum are synchronized so that columns abut, edge to edge, without overlap or gap. Use of liquid toner allows edges to blend so that they are not discernible in the final image. Each ditigal word is transmitted in a flat electrical cable 137 to head 51. A digital word, consisting of say 1,024 bits is transmitted to the head. A source of high voltage applied to the head allows the binary bits to be converted to electrical charge transferred onto sheet 13 by the linear array of wires in the head. Paper to be written upon is treated with a dielectric substance for charge retaining purposes. Such papers are commercially available, for example "Electrographic Paper" sold by Crown Zellerbach Corporation.

After printing a series of columns, which appear to be helical stripes and then toning with a developer of a first color, the head is caused to fly back for a second pass. After this is complete, the head is caused to fly back for a third scan with developer of the third color. Finally, upon completion of this scan, the head is again caused to fly back and then again scan across the paper applying toner in a fourth shoe, the toner shoes having been indexed one after another underneath the head by screw 70 and motor 69. After the fourth pass, paper is released from drum 11 by releasing vacumm in the channels 27 and 29 and by moving the pickoff fingers 139 into contact with the drum, thereby causing sheet 13 to slide over the pickoff fingers as indicated by the dashed arrows 141 and sheet 143. Passage of the sheet 143 past the pickoff fingers is sensed by an optical sensor 145. The pickoff fingers are moved by a motor 147 which can adjust the fingers to move into position once printing is complete. Control panel 137 has various status indicators for signalling printing progress as well as manual override controls for interrupting printer operation or resetting the printing.

Figure 3:
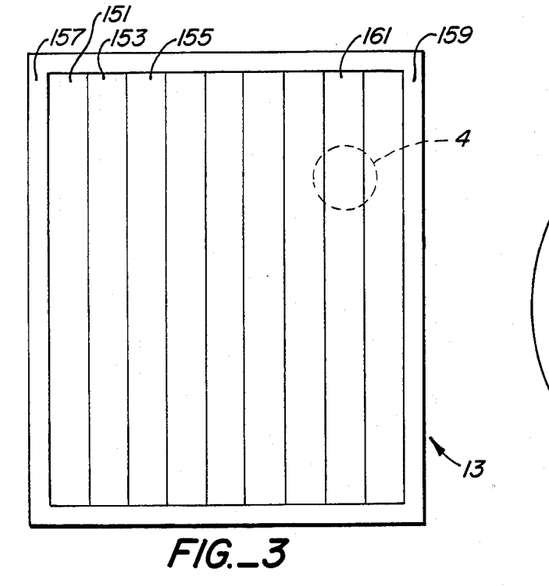
FIG. 3 is a top view of a sheet illustrating the scanning pattern of the present invention.

FIG. 3 shows a sheet 13 consisting of columns 151, 153, 155, 161 and so on. A page offset 157 exists on the left hand side and a page offset 159 exists on the right hand side. In these page offsets, no printing exists. The area of the paper accessable for printing must be a multiple of the width of the head. In the example of FIG. 3, nine columns are shown, each column being the width of the head. To print sheet 13 nine revolutions of the drum would be necessary, with page offset columns 157 and 159 being blank since the head did not pass over these regions. The lateral motion of the head is smooth and continuous so that when the paper sheet is wrapped about the drum, the columns appear to be a continuous helical spiral, without any spaces or overlap in the spiral pattern.

Figure 4:
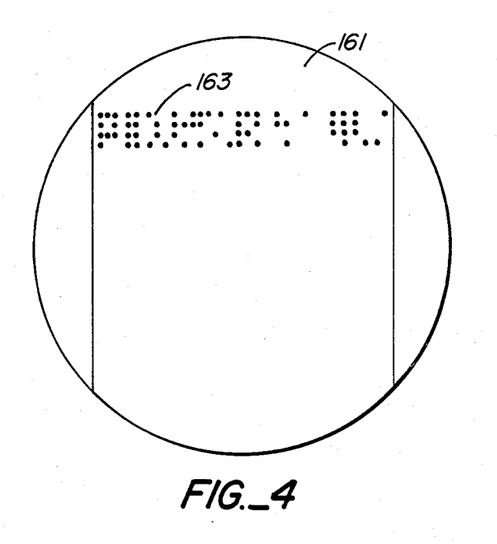
FIG. 4 is a detail of the sheet illustrated in FIG. 3.

FIG. 4 illustrates a printing sample within a column indicated by the dashed circle 4 in FIG. 3. In FIG. 4, the head and a toner shoe has moved over column 161 developing a latent image and this latent image has been toned to form a dot pattern 163, the dots appearing to be in rows and columns. The maximum number of dots possible equals the number of wire elements in the head extending from side to side. The dot pattern of FIG. 4 is merely illustrative of the writing of digital words with bit patterns which span a column from edge to edge. The bit patterns consist of the presence and absence of charge which is made visible by toning. Where charge is applied, the image is toned, giving a dark dot appearance. Since the charge is quite localized, the pattern appears to be a grid-like array of dots. Each position in the array is an image pixel which is either dark or light depending upon whether charge was deposited in an array location.

Figure 5:
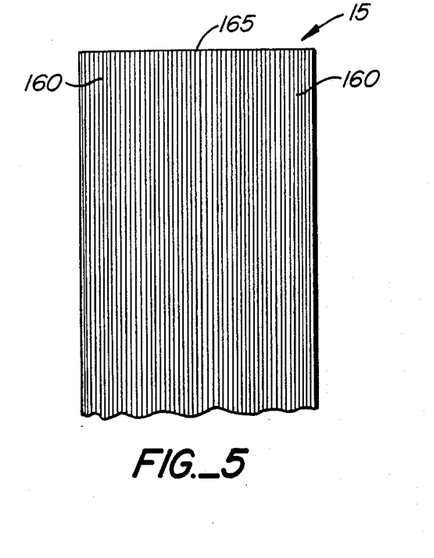
FIG. 5 is a partial top view of a scanning head in accord with the present invention.
Figure 6:
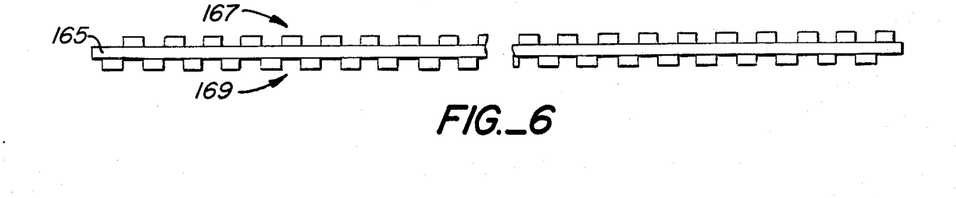
FIG. 6 is a magnified front edge view of the scanning head illustrated in FIG. 5.

FIG. 5 shows that the head 15 consists of a series of very fine wires 160 deposited on a very thin circuit board 165. It is possible to use charging elements other than wires, but in this case wires present a manufacturing advantage. The wires extend completely across the board, on upper and lower surfaces. This is illustrated in FIG. 6 where the board 165 is seen end-on. It has an upper set of wires 167 and a lower set of wires 169. The board itself is only about 2.5 mils thick. The wires or charging elements are positioned at a density of more than 150 wires per centimeter or about 400 wires per inch, with 512 wires per side and an air or other insulative gap between adjacent wires so that they do not short each other out. As may be seen, the wires are slightly offset from each other, with a total of 1024 wires on two sides. This number is selected because it is convenient for digital processing. The wires 167 and 169 are parallel, mutually insulated traces which are plated onto board 165 using well-known photolithographic techniques. One of the advantages of the present invention is that the head used herein is relatively inexpensive compared to line printer heads and other full width electrostatic heads wich are very expensive.

Figure 7:
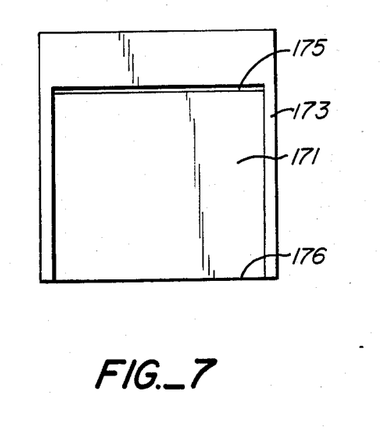
FIG. 7 is a bottom view of a toning shoe used in the present invention.

In FIG. 7, a detail of a toning shoe is seen. The shoe has a recessed region 171, about five mils deep, and a projecting rim 173 which is brought into contact with paper being scanned. The rim is about one-eighth inch wide on opposed sides and about one half inch wide at the leading edge. Developer slit 175, near the leading edge, applies developer onto a charged sheet, immediately below the head and the developer is allowed to pass through the recessed area 171 to spillway 176 and is then collected for recycling.

Figure 8:
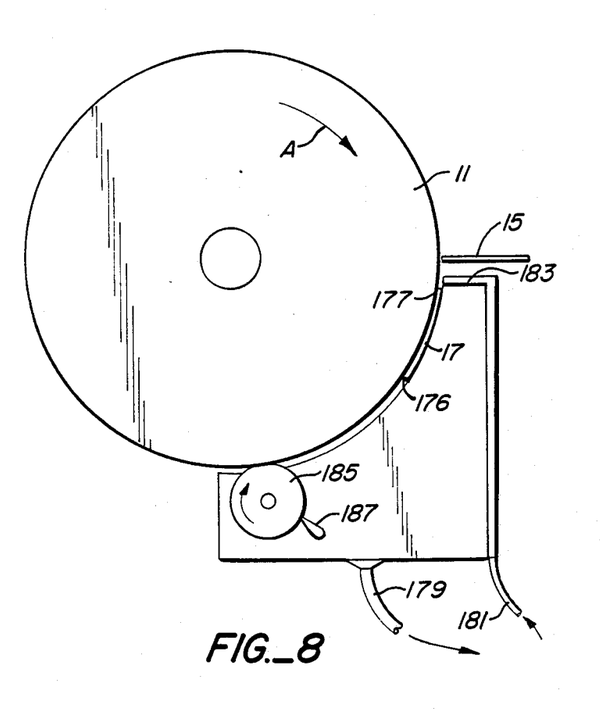
FIG. 8 is a side plan view illustrating relative operative positions of the drum, head and toning shoe illustrated in FIG. 2.

In FIG. 8, the drum 11 is seen to be rotating in the direction indicated by the arrow A. The electrostatic head 15 is in mechanical contact with a paper sheet mounted on the drum, applying charge thereto. A toning shoe 17, having an arcuate peripheral shape facing the drum applies toner to a localized area corresponding to a column or a latent image stripe. The latent image created by the head 15 is thus toned and formed into a visible image. Toner applied at the upper portion of the shoe 177 is allowed to pass through the central recessed area of the shoe eand then fall past spillway 176 into a sump for collection through drain tube 179. New developer is supplied through the inlet tube 181 and flows through the wall of the shoe to a supply port 183 where the supply of developer is replenished and injected into the shoe for application to the sheet. The drying roller 185 is seen to be carried within the same housing as the shoe and contacts drum 11 for removing excess developer. Once the excess is removed, it is scraped from the drying roller by a scraper blade 187. Again, excess developer falls into the sump for collection and recycling.

Figure 9:
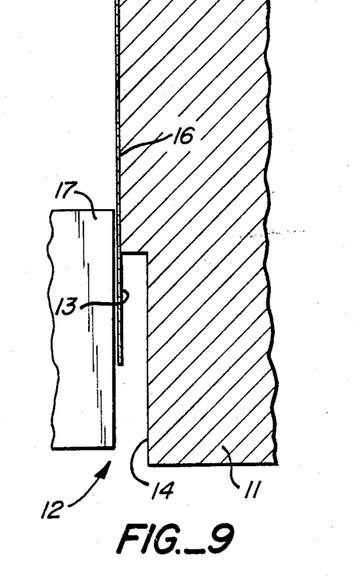
FIG. 9 is a sectional view of an edge of the drum, with a sheet of paper thereon and a toning shoe above the paper.

With reference to FIG. 9, an exploded detail of drum 11 is seen. An edge of the drum 12 has a recessed shoulder 14 which is approximately one-quarter inch below the principal drum surface 16. The sheet of paper 13 overhangs the main drum surface 16 by a fraction of an inch. If the toning shoe 17 passes over overhanging portion 13, excess developer will run down the face of the shoe and avoid contact with drum 11. Without the presence of the recessed shoulder, developer would enter the small space between sheet 13 and drum 11 and by capillary action spread onto the back side of sheet 13 and onto the main drum surface, causing a buildup of toner on the drum. This leads to deterioration of the drum surface, since a residue of toner particles accumulates on the drum. The recessed shoulder portion 14 exists on opposite sides of the drum.

The drum of the present invention provides good sheet stability, with a fast printing element compared to those used in conventional facsimile systems. Speed is attained without the expense involved in full-width line printer heads. Color printing is achieved with precise color dot registration with only a few passes of the head over the scanned sheet.

We claim:

1. An electrostatic printer comprising,
   drum means rotating about an axis for supporting a dielectric sheet,
   electrostatic head means having a linear array of closely spaced charging elements with a head width exceeding one centimeter for writing an electrostatic latent image stripe on said sheet, said stripe consisting of a column of digital multi-bit words, each bit in a word fed to a wire, the bits in a word representing image pixels spanning the width of an image stripe,
   means synchronizing motion of said head means parallel to the drum axis, in close proximity to said dielectric sheet, for scanning said sheet in a helical pattern of abutting strips, and
   means following said electrostatic head and having approximately the same width as the head for applying fluid developer to said latent image, thereby creating a visible image.

2. The printer of claim 1 wherein said means for applying fluid developer comprises a shoe with peripheral edges and a central recessed portion, the peripheral edges contacting said dielectric sheet near opposed lateral boundaries of a stripe, said shoe having means for injecting fluid developer onto a stripe latent image.

3. The printer of claim 1 wherein said means for applying fluid developer to said latent image comprises a plurality of toning shoes, one associated with each of a plurality of primary colors and means for indexing a toning shoe to a desired position relative to the sheet.

4. The printer of claim 3 wherein said printer further comprises flyback means for scanning said sheet a plurality of times, one time associated with each of said primary colors.

5. The printer of claim 3 wherein said plurality of containers are movably positioned for alignment with said stripe.

6. The printer of claim 1 wherein said means for synchronizing motion of the head comprises a lead screw having threads mounting a movable carrier to which said head is mounted, said lead screw turning at a rate relative to drum rotation for forming parallel, abutting latent image stripes.

7. The printer of claim 6 wherein said movable carrier is connected to actuator means for detaching said carrier from said lead screw on an end-of-path signal, sensor means for signalling the end-of-path position of the carrier on the lead screw to said actuator means whereupon said actuator detaches the carrier, and flyback means for moving the detached carrier from the end of the lead screw to the beginning thereof.

8. The printer of claim 6 wherein said removable carrier comprises a half-nut.

9. The printer of claim 1 wherein said electrostatic head means comprises a thin card with opposed major surfaces, at least one of said surfaces having a plurality of closely spaced, mutually insulated wires terminating at an edge of the card, said wires forming said linear array of closely spaced charging elements.

10. The printer of claim 9 wherein each of said opposed major surfaces has a plurality of closely spaced, mutually insulated wires terminating at an edge of the card, the wires of one surface being offset from the wires of the other surface, the combined group of wires on said opposed major surfaces forming said linear array of closely spaced charging elements.

11. The printer of claim 1 further comprising means for synchronizing writing of the head, said means having an optical encoder means operatively associated with said drum for signalling the top-of-sheet to said means for electrically charging said sheet whereby stripe positions are aligned at the top-of sheet.

12. The printer of claim 1 wherein the density of closely spaced charging elements exceeds 150 elements per centimeter.

13. An electrostatic printer comprising,
    a rotating drum having an axis, an outer surface and having means for securing a dielectric sheet to said outer surface,
    an electrostatic head having a linear array of closely spaced charging elements with a head width exceeding one centimeter, said array having more than 50 elements,
    means synchronizing motion of said head parallel to the drums axis, in close proximity to said dielectric sheet, for scanning said sheet in a helical pattern of abutting stripes,
    means for electrostatically charging said dielectric sheet through selected charging elements in accord with a strip signal thereby forming a helically-written, electrostatic, latent image, and
    means following said electrostatic head and having approximately the same width as the head for applying fluid developer to said latent image.

14. The printer of claim 13 wherein said means for applying fluid developer comprises a shoe with peripheral edges and a central recessed portion, the peripheral edges contacting said dielectric sheet near opposed lateral boundaries of a stripe, said shoe having means for injecting fluid developer onto a stripe latent image.

15. The printer of claim 13 wherein said means for applying fluid developer to said latent image comprises a plurality of toning shoes, one associated with each of a plurality of primary colors and means for indexing a toning shoe to a desired position relative to the sheet.

16. The printer of claim 15 wherein said printer further comprises means for scanning said sheet a plurality of times, one time associated with each of said primary colors.

17. The printer of claim 15 wherein said plurailty of toning shoes are movably positioned for alignment with said stripe.

18. The printer of claim 13 wherein the density of closely spaced charging elements exceeds 150 elements per centimeter.

19. The printer of claim wherein said means for synchronizing motion of the head comprises a lead screw having threads mounting a removable carrier to which said head is mounted, said lead screw turning at a rate relative to drum rotation for forming parallel, abutting latent image stripes.

20. The printer of claim 19 wherein said removable carrier is connected to actuator means for retracting said carrier from said lead screw on an end-of-path signal, switch means for signalling the end-of-path position of the carrier on the lead screw to said actuator means whereupon said actuator retracts the carrier, and flyback means for moving the retracted carrier from the end of the lead screw to the beginning thereof.

21. The printer of claim 19 wherein said removable carrier comprises a half-nut.

22. The printer of claim 13 wherein said electrostatic head comprises a thin card with opposed major surfaces, at least one of said surfaces having a plurality of closely spaced, mutually insulated wires terminating at an edge of the card, said wires forming said linear array of closely spaced charging elements.

23. The printer of claim 22 wherein each of said opposed major surfaces has a plurality of closely spaced, mutually insulated wires terminating at an edge of the card, the wires of one surface being offset from the wires of the other surface, the combined group of wires on said opposed major surfaces forming said linear array of closely spaced charging elements.

24. The printer of claim 13 further comprising means for synchronizing writing of the head, said means having an optical encoder means operatively associated with said drum for signalling the top-of-sheet to said means for electrically charging said sheet whereby stripe positions are aligned at the top-of sheet.

25. A printing method comprising,
rotating a printable substrate on a drum,
electrostatically writing a helical latent image on the substrate formed by less than 40 stripes each having a minimum width of one centimeter abutting each other in edge-to-edge contact, each stripe being a columnar mosaic element of electrostatic charge, and
developing the latent image while the substrate is still on said drum.

26. The method of claim 25 wherein electrostatically writing on the substrate is by charging a plurality of closely spaced parallel wires in accord with an electrical signal representing image pixels having a width equal to the width of a stripe.

27. The method of claim further defined by advancing the position of said closely spaced wires during rotation of the drum forming said helix of abutting stripes.

28. The method of claim 26 wherein said image pixels having a width equal width of a stripe are formed by optically scanning a document with an optical linear array having a width corresponding to the width of said stripe and coverting the optical signal into an electrical charge signal applied to said wires.

29. In a drum supporting a sheet to be toned by application of liquid toner to the sheet the improvement comprising,
a radially recessed shoulder near a lateral edge of the drum, an edge of said sheet overhanging the recessed shoulder whereby toner applied to the sheet is unsupported in the vicinity of the edge of the sheet.

* * * * *

UNITED STATES PATENT AND TRADEMARK OFFICE
CERTIFICATE OF CORRECTION

PATENT NO. : 4,849,776

DATED : July 18, 1989

INVENTOR(S) : Arthur E. Bliss et al.

It is certified that error appears in the above-identified patent and that said Letters Patent is hereby corrected as shown below:

Column 5, line 23, "vacumm" should read - - vacuum - -.

Column 6, line 23, "wich" should read - - which - -.

Claim 1, column 7, line 19, "fed to a wire," should read - - fed to a charging element of the head, - -.

Claim 2, column 7, lines 30-35 should read as follows:
- - An electrostatic printer comprising,
drum means rotating about an axis for supporting a dielectric sheet,
electrostatic head means having a linear array of closely spaced charging elements with a head width exceeding one centimeter for writing an electrostatic latent image stripe on said sheet, said stripe consisting of a column of digital multi-bit words, each bit in a word fed to a charging element of the head, the bits in a word representing image pixels spanning the width of an image stripe,
means synchronizing motion of said head means parallel to the drum axis, in close proximity to said dielectric sheet, for scanning said sheet in a helical pattern of abutting stripes, and
means following said electrostatic head and having approximately the same width as the head for applying fluid developer to said latent image, thereby creating a visible image,
wherein said means for applying fluid developer comprises a shoe with peripheral edges and a central recessed portion, the peripheral edges contacting said dielectric sheet near opposed lateral boundaries of a stripe, said shoe having means for injecting fluid developer onto a stripe latent image. - -.

UNITED STATES PATENT AND TRADEMARK OFFICE
CERTIFICATE OF CORRECTION

PATENT NO. : 4,849,776

DATED : July 18, 1989

INVENTOR(S) : Arthur E. Bliss et al.

It is certified that error appears in the above-identified patent and that said Letters Patent is hereby corrected as shown below:

Claim 3, column 7, lines 36-40 should read as follows:
- - An electrostatic printer comprising,
drum means rotating about an axis for supporting a dielectric sheet,
electrostatic head means having a linear array of closely spaced charging elements with a head width exceeding one centimeter for writing an electrostatic latent image stripe on said sheet, said stripe consisting of a column of digital multi-bit words, each bit in a word fed to a charging element of the head, the bits in a word representing image pixels spanning the width of an image stripe,
means synchronizing motion of said head means parallel to the drum axis, in close proximity to said dielectric sheet, for scanning said sheet in a helical pattern of abutting stripes, and
means following said electrostatic head and having approximately the same width as the head for applying fluid developer to said latent image, thereby creating a visible image,
wherein said means for applying fluid developer to said latent image comprises a plurality of toning shoes, one associated with each of a plurality of primary colors and means for indexing a toning shoe to a desired position relative to the sheet. - -.

Claim 6, column 7, lines 48-53 should read as follows:
- - An electrostatic printer comprising,
drum means rotating about an axis for supporting a dielectric sheet,
electrostatic head means having a linear array of closely spaced charging elements with a head width exceeding one centimeter for writing an electrostatic latent image stripe on said sheet, said stripe consisting of a column of digital multi-bit words, each bit in a word fed to a charging

UNITED STATES PATENT AND TRADEMARK OFFICE
CERTIFICATE OF CORRECTION

PATENT NO. : 4,849,776

DATED : July 18, 1989

INVENTOR(S) : Arthur E. Bliss et al.

It is certified that error appears in the above-identified patent and that said Letters Patent is hereby corrected as shown below:

element of the head, the bits in a word representing image pixels spanning the width of an image stripe, means synchronizing motion of said head means parallel to the drum axis, in close proximity to said dielectric sheet, for scanning said sheet in a helical pattern of abutting stripes, and means following said electrostatic head and having approximately the same width as the head for applying fluid developer to said latent image, thereby creating a visible image, wherein said means for synchronizing motion of the head comprises a lead screw having threads mounting a movable carrier to which said head is mounted, said lead screw turning at a rate relative to drum rotation for forming parallel, abutting latent image stripes. - -.

Claim 9, column 7, line 65 to column 8, line 2 should read as follows:

- - An electrostatic printer comprising, drum means rotating about an axis for supporting a dielectric sheet, electrostatic head means having a linear array of closely spaced charging elements with a head width exceeding one centimeter for writing an electrostatic latent image stripe on said sheet, said stripe consisting of a column of digital multi-bit words, each bit in a word fed to a charging element of the head, the bits in a word representing image pixels spanning the width of an image stripe, means synchronizing motion of said head means parallel to the drum axis, in close proximity to said dielectric sheet, for scanning said sheet in a helical pattern of abutting stripes, and

UNITED STATES PATENT AND TRADEMARK OFFICE
CERTIFICATE OF CORRECTION

PATENT NO. : 4,849,776
DATED : July 18, 1989
INVENTOR(S) : Arthur E. Bliss et al.

It is certified that error appears in the above-identified patent and that said Letters Patent is hereby corrected as shown below:

means following said electrostatic head and having approximately the same width as the head for applying fluid developer to said latent image, thereby creating a visible image,
wherein said electrostatic head means comprises a thin card with opposed major surfaces, at least one of said surfaces having a plurality of closely spaced, mutually insulated wires terminating at an edge of the card, said wires forming said linear array of closely spaced charging elements - -.

Claim 13, column 8, line 28, "the drums axis" should read
- - the drum axis - -.

Claim 13, column 8, line 33, "with a strip signal" should read
- - with a stripe signal - -.

Claim 14, column 8, lines 38-43 should read as follows:
- - An electrostatic printer comprising,
a rotating drum having an axis, an outer surface and having means for securing a dielectric sheet to said outer surface,
an electrostatic head having a linear array of closely spaced charging elements with a head width exceeding one centimeter, said array having more that 50 elements,
means synchronizing motion of said head parallel to the drum axis, in close proximity to said dielectric sheet, for scanning said sheet in a helical pattern of abutting stripes,
means for electrostatically charging said dielectric sheet through selected charging elements in accord with a stripe signal thereby forming a helically-written, electrostatic, latent image, and
means following said electrostatic head and having approximately the same width as the head for applying fluid developer to said latent image,

UNITED STATES PATENT AND TRADEMARK OFFICE
CERTIFICATE OF CORRECTION

PATENT NO. : 4,849,776
DATED : July 18, 1989
INVENTOR(S) : Arthur E. Bliss et al.

It is certified that error appears in the above-identified patent and that said Letters Patent is hereby corrected as shown below:

wherein said means for applying fluid developer comprises a shoe with peripheral edges and a central recessed portion, the peripheral edges contacting said dielectric sheet near opposed lateral boundaries of a stripe, said shoe having means for injecting fluid developer onto a stripe latent image. - -.

Claim 15, column 8, lines 44-48 should read as follows:
- - An electrostatic printer comprising,
a rotating drum having an axis, an outer surface and having means for securing a dielectric sheet to said outer surface,
an electrostatic head having a linear array of closely spaced charging elements with a head width exceeding one centimeter, said array having more that 50 elements,
means synchronizing motion of said head parallel to the drum axis, in close proximity to said dielectric sheet, for scanning said sheet in a helical pattern of abutting stripes,
means for electrostatically charging said dielectric sheet through selected charging elements in accord with a stripe signal thereby forming a helically-written, electrostatic, latent image, and
means following said electrostatic head and having approximately the same width as the head for applying fluid developer to said latent image,
wherein said means for applying fluid developer to said latent image comprises a plurality of toning shoes, one associated with each of a plurality of primary colors and means for indexing a toning shoe to a desired position relative to the sheet. - -.

UNITED STATES PATENT AND TRADEMARK OFFICE
CERTIFICATE OF CORRECTION

PATENT NO. : 4,849,776

DATED : July 18, 1989

INVENTOR(S) : Arthur E. Bliss et al.

It is certified that error appears in the above-identified patent and that said Letters Patent is hereby corrected as shown below:

Claim 19, column 8, lines 59-64 should read as follows:
-- An electrostatic printer comprising,
a rotating drum having an axis, an outer surface and having means
    for securing a dielectric sheet to said outer surface,
an electrostatic head having a linear array of closely spaced
    charging elements with a head width exceeding one centi-
    meter, said array having more that 50 elements,
means synchronizing motion of said head parallel to the drum axis,
    in close proximity to said dielectric sheet, for scanning
    said sheet in a helical pattern of abutting stripes,
means for electrostatically charging said dielectric sheet through
    selected charging elements in accord with a stripe signal
    thereby forming a helically-written, electrostatic, latent
    image, and
means following said electrostatic head and having approximately
    the same width as the head for applying fluid developer to
    said latent image,
wherein said means for synchronizing motion of the head comprises
    a lead screw having threads mounting a removable carrier to
    which said head is mounted, said lead screw turning at a
    rate relative to drum rotation for forming parallel,
    abutting latent image stripes.

Claim 22, column 9, lines 7-12 should read as follows:
-- An electrostatic printer comprising,
a rotating drum having an axis, an outer surface and having means
    for securing a dielectric sheet to said outer surface,
an electrostatic head having a linear array of closely spaced
    charging elements with a head width exceeding one centi-
    meter, said array having more that 50 elements,
means synchronizing motion of said head parallel to the drum axis,
    in close proximity to said dielectric sheet, for scanning
    said sheet in a helical pattern of abutting stripes,

UNITED STATES PATENT AND TRADEMARK OFFICE
CERTIFICATE OF CORRECTION

PATENT NO. : 4,849,776

DATED : July 18, 1989

INVENTOR(S) : Arthur E. Bliss et al.

Page 7 of 8

It is certified that error appears in the above-identified patent and that said Letters Patent is hereby corrected as shown below:

means for electrostatically charging said dielectric sheet through selected charging elements in accord with a stripe signal thereby forming a helically-written, electrostatic, latent image, and means following said electrostatic head and having approximately the same width as the head for applying fluid developer to said latent image, wherein said electrostatic head comprises a thin card with opposed major surfaces, at least one of said surfaces having a plurality of closely spaced, mutually insulated wires terminating at an edge of the card, said wires forming said linear array of closely spaced charging elements.

Claim 24, column 9, lines 20 should read as follows:
- - An electrostatic printer comprising, a rotating drum having an axis, an outer surface and having means for securing a dielectric sheet to said outer surface, an electrostatic head having a linear array of closely spaced charging elements with a head width exceeding one centimeter, said array having more that 50 elements, means synchronizing motion of said head parallel to the drum axis, in close proximity to said dielectric sheet, for scanning said sheet in a helical pattern of abutting stripes, means for electrostatically charging said dielectric sheet through selected charging elements in accord with a stripe signal thereby forming a helically-written, electrostatic, latent image, and means following said electrostatic head and having approximately the same width as the head for applying fluid developer to said latent image,

UNITED STATES PATENT AND TRADEMARK OFFICE
CERTIFICATE OF CORRECTION

PATENT NO. : 4,849,776
DATED : July 18, 1989
INVENTOR(S) : Arthur E. Bliss et al.

It is certified that error appears in the above-identified patent and that said Letters Patent is hereby corrected as shown below:

means for synchronizing writing of the head, said means having an optical encoder means operatively associated with said drum for signaling the top-of-sheet to said means for electrically charging said sheet whereby stripe positions are aligned at the top-of-sheet.

Claim 25, column 9, lines 28-29, "writing a helical latent image on the substrate formed by less than 40 stripes" should read -- writing a latent image in a helical manner on the substrate, said latent image formed by a sequential scanning of less than 40 stripes --.

Claim 27, column 10, line 11, "The method of claim further" should read -- The method of claim 26 further --.

Claim 28, column 10, line 16, "a width equal width" should read -- a width equal to the width --.

Claim 28, column 10, line 19, "coverting" should read -- converting --.

Signed and Sealed this

Fourth Day of December, 1990

Attest:

HARRY F. MANBECK, JR.

Attesting Officer  Commissioner of Patents and Trademarks